US007218845B2

(12) United States Patent
Beyrouti

(10) Patent No.: US 7,218,845 B2
(45) Date of Patent: May 15, 2007

(54) READING IMAGE FRAMES AS FILES

(75) Inventor: Fadi Beyrouti, Montreal (CA)

(73) Assignee: Autodesk Canada Co., Montreal, Quebec (CA)

( * ) Notice: Subject to any disclaimer, the term of this patent is extended or adjusted under 35 U.S.C. 154(b) by 1206 days.

(21) Appl. No.: 09/947,708

(22) Filed: Sep. 6, 2001

(65) Prior Publication Data

US 2002/0006265 A1    Jan. 17, 2002

(30) Foreign Application Priority Data

Apr. 19, 2001   (GB)   ................. 0109624.7

(51) Int. Cl.
*H04N 5/76*  (2006.01)
*H04N 7/01*  (2006.01)
*H04N 11/20* (2006.01)
*H04N 9/64*  (2006.01)

(52) U.S. Cl. ................ 386/131; 348/441; 348/714; 348/715

(58) Field of Classification Search ............... 386/1, 386/45, 125, 126, 131; 348/441, 714, 715
See application file for complete search history.

(56) References Cited

U.S. PATENT DOCUMENTS 4,920,432 A * 4/1990 Eggers et al. ............. 386/96

| 5,457,491 | A | 10/1995 | Mowry |
| 5,519,439 | A | 5/1996 | Keith |
| 6,055,354 | A | 4/2000 | Bopardikar |
| 6,118,931 | A | 9/2000 | Bopardikar |
| 6,829,012 | B2 * | 12/2004 | Tarnoff et al. ............. 348/441 |

FOREIGN PATENT DOCUMENTS

| EP | 0 619 675 A1 | 10/1994 |
| EP | 0 936 814 A1 | 8/1999 |
| WO | WO 90/05422 | 5/1990 |

* cited by examiner

*Primary Examiner*—Thai Q. Tran
*Assistant Examiner*—Nigar Chowdhury
(74) *Attorney, Agent, or Firm*—Gates & Cooper LLP

(57) ABSTRACT

First selected image frames in a native format are read from a frame storage device (103) and are directly modified in response to a first process. Output signals are supplied to a display device (102) such that the display device displays a view of stored frames. The frames are stored in the native format but appear in the view as if stored in an alternative format. Frames are selected and in response to receiving input selection signals, selected frames are translated into an alternative format and supplied to a second process in the translated formats.

36 Claims, 17 Drawing Sheets

READING IMAGE FRAMES AS FILES

CROSS-REFERENCE TO RELATED APPLICATIONS

This application claims the benefit under 35 U.S.C. Section 119 of the following co-pending and commonly-assigned United Kingdom patent application, which is incorporated by reference herein:

United Kingdom Patent Application Serial No. 01 09 624.7, filed Apr. 19, 2001, by Fadi Beyrouti, entitled "IMAGE DATA PROCESSING".

This application is related to the following co-pending and commonly-assigned patent(s)/patent applications, which patent(s)/applications are incorporated by reference herein:

U.S. patent application Ser. No. 08/838,738, filed Apr. 11, 1997, by Raju C. Bopardikar, entitled "DATA STORAGE APPARATUS", now U.S. Pat. No. 6,055,354, issued on Apr. 25, 2000, which patent claims the benefit of U.S. application Ser. No. 60/015,410 filed on Apr. 15, 1996 and U.S. application Ser. No. 60/015,469 filed on Apr. 15, 1996; and U.S. patent application Ser. No. 08/835,960, filed Apr. 11, 1997, by Raju C. Bopardikar, entitled "VIDEO DATA STORAGE", now U.S. Pat. No. 6,118,931, issued on Sep. 12, 2000, which patent claims the benefit of U.S. application Ser. No. 60/015,412 filed on Apr. 15, 1996.

BACKGROUND OF THE INVENTION

1. Field of the Invention

The present invention relates to image data processing in which an image frame store has many storage devices, such as disk drives, configured to store image frames of a predetermined definition.

2. Description of the Related Art

It is known to store image frames, such as frames forming part of a video or cinematographic film, on arrays of disk drives, as disclosed in U.S. Pat. Nos. 6,055,354 and 6,118,931. Each image frame is divided into a plurality of stripes and data from said stripes is written to or read from an array of disks in parallel. Preferably, the array includes redundancy such that, should a disk crash occur, it is possible for lost data to be reconstituted. Furthermore, such an approach allows relatively inexpensive disks to be used therefore it is known for configurations of this type to be referred to as a redundant array of inexpensive disks, usually abbreviated to the acronym RAID.

When image frames are written to a disk array, each image frame is divided into a plurality of stripes with one disk receiving the data derived from one stripe. In this way, the number of stripes present within the image equates to the number of disks being used in the array. The actual number of stripes required for a particular image, for a given disk transfer speed and storage capacity, will depend upon the size of the image frames themselves. Thus, in many systems, it is possible to process standard NTSC/PAL video signals in combination with much larger image frames possibly generated under the high definition video protocol or derived form scanning cinematographic film.

It is known to partition an array of disks such that each partition is configured to provide optimal transfer of image frames at a particular definition. Once partitioned in this way, each partition only receives or supplies frames of the definition under consideration therefore its file structure may be optimised by taking account of this constraint. Thus, such an approach differs significantly from general purpose operating systems in which frames may be stored as files within a directory structure.

A computer program that processes image frames stored in the aforementioned format is licensed by the present Assignee under the trademark "FLAME". Flame and its related products has a native file system which optimises the transfer of image frame data to and from disk storage devices. Such an approach optimises operational characteristics where great emphasis is placed on being able to transfer large quantities of image data for real-time viewing or multiple real-time processing.

In addition to operating with a storage system that is optimised for transferring frames of constant definition, the user interface of the Flame system is constrained so as to be more sympathetic to existing video/film editing/effects processing. Thus, within the native Flame environment, data is not divided up into levels of directories and sub-directories, as is often the case with general purpose processing environments. Thus, within the native frame store system, there is a notion of a clip library for a particular project that may contain desktops, reels and clips. A reel may be contained within a desk top and a clip may be contained within a reel. A clip consists of a plurality of contiguous frames and thereby maintains the analogy with the physical editing of cinematographic film.

Flame is one of many programs that is capable of directly processing image frames stored in the native format. However, an increasing number of useful image processing applications are available that have been developed for execution within a general purpose processing environment. In order to achieve this, it is known to export frames from the native system such that the frame data is stored again in a file-based configuration. However, a problem with this known approach is that it is necessary to make multiple copies of the data thereby significantly increasing storage requirements. In addition, procedures of this type result in several versions of the data being generated such that problems may occur in terms of identifying the most recent. Furthermore, when storing data in conventional file-based systems, reductions will occur in terms of the rate of data transfer thereby limiting the system's ability to transfer and display image frames in real-time.

BRIEF SUMMARY OF THE INVENTION

According to an aspect of the present invention, there is provided image data processing apparatus, comprising programmable processing means including interface means for receiving input signals from an input device and for supplying output signals to a display device. The image frame storage means has a plurality of storage devices configured to store image frames of a predetermined definition, and program instructions storage means configured to supply program instructions to said processing means. First selected image frames are in a native format and are read from the frame storage means and then directly modified in response to a first program. Second selected image frames are read from the frames' storage means and modified after translation into an alternative format. This translation process is achieved by the first processing means being configured to produce output signals to display a view of the stored frames. The stored frames are stored in their native format but appear in the view as if stored in the alternative format. Upon receiving input signals selecting a displayed frame, the processing means translates the selected stored frame into the alternative format and supplies the translated frame to the second program.

Thus, in accordance with the invention, the second program allows the viewing of frame data as if said frame data is stored in a conventional file-based directory structure. However, this view of the image data has been synthesised and does not actually exist in this format until a request is made to receive a frame-file. The request is interpreted and a selected frame is then translated on the fly and provided to the second program. Consequently, the files are available to the second program when requested by the second program. However, these files do not take up unnecessary storage space because they are only created as when required. Preferably, the translated data would remain resident within the memory structure thereby not requiring any additional disk storage space.

BEST MODE FOR CARRYING OUT THE INVENTION

FIG. 1

Figure 1:
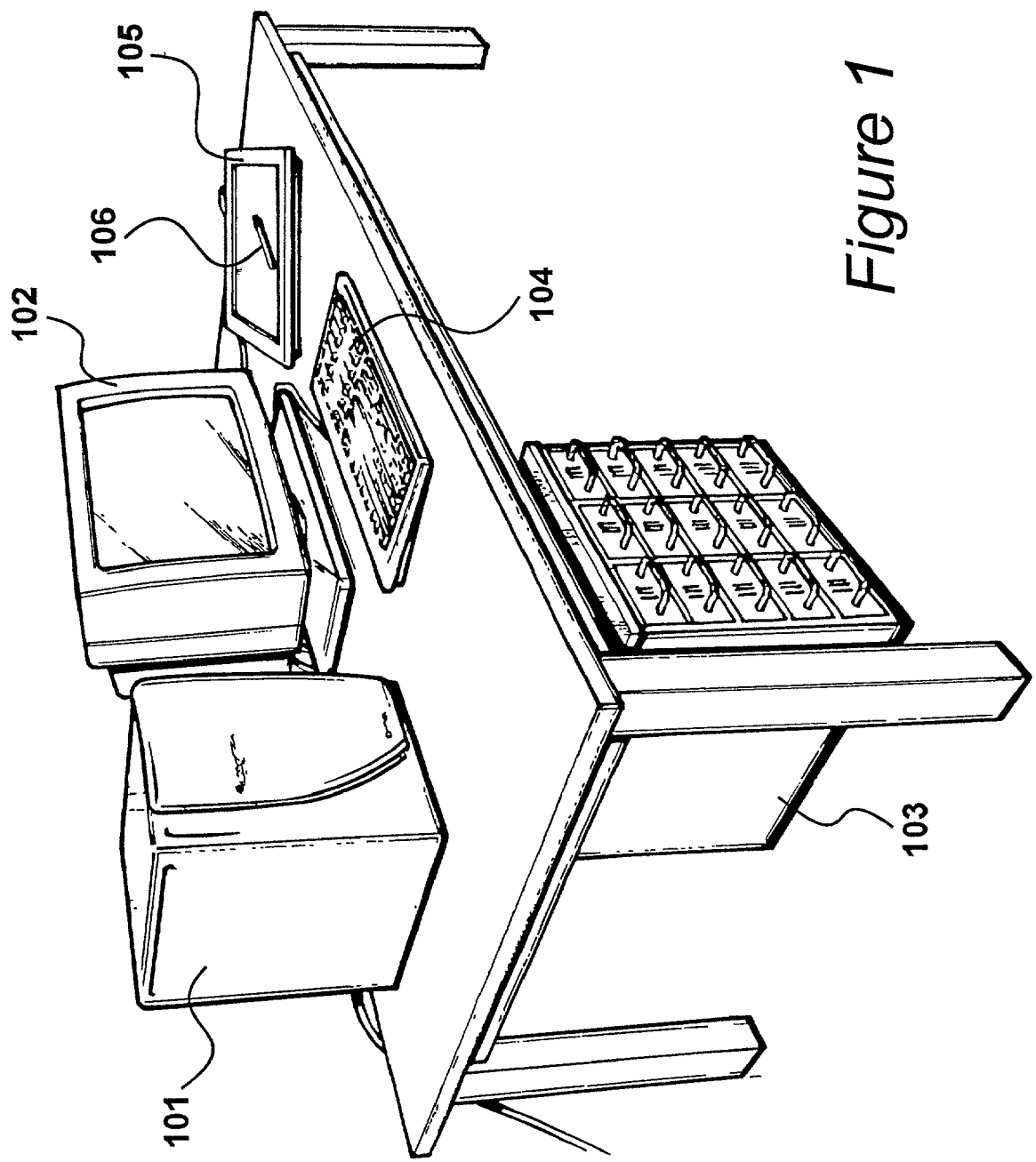
FIG. 1 shows an image data processing environment.

An image data processing environment is shown in FIG. 1, including a programmable processing system, such as an Octane computer manufactured by Silicon Graphics Inc. Processing system 101 provides output display data to a high definition visual display unit 102. Image data stored on an array of disk drives 103 and input commands to the processing system 101 are received via a keyboard 104 and via a touch tablet 105 and stylus 106. The environment shown in FIG. 1 may take the form of an isolated stand alone system, or alternatively, the system may be networked to a plurality of similar or different systems.

In addition to the particular component shown in FIG. 1, the invention may be embodied within many alternative environments using processing systems of varying capabilities.

FIG. 2

Figure 2:
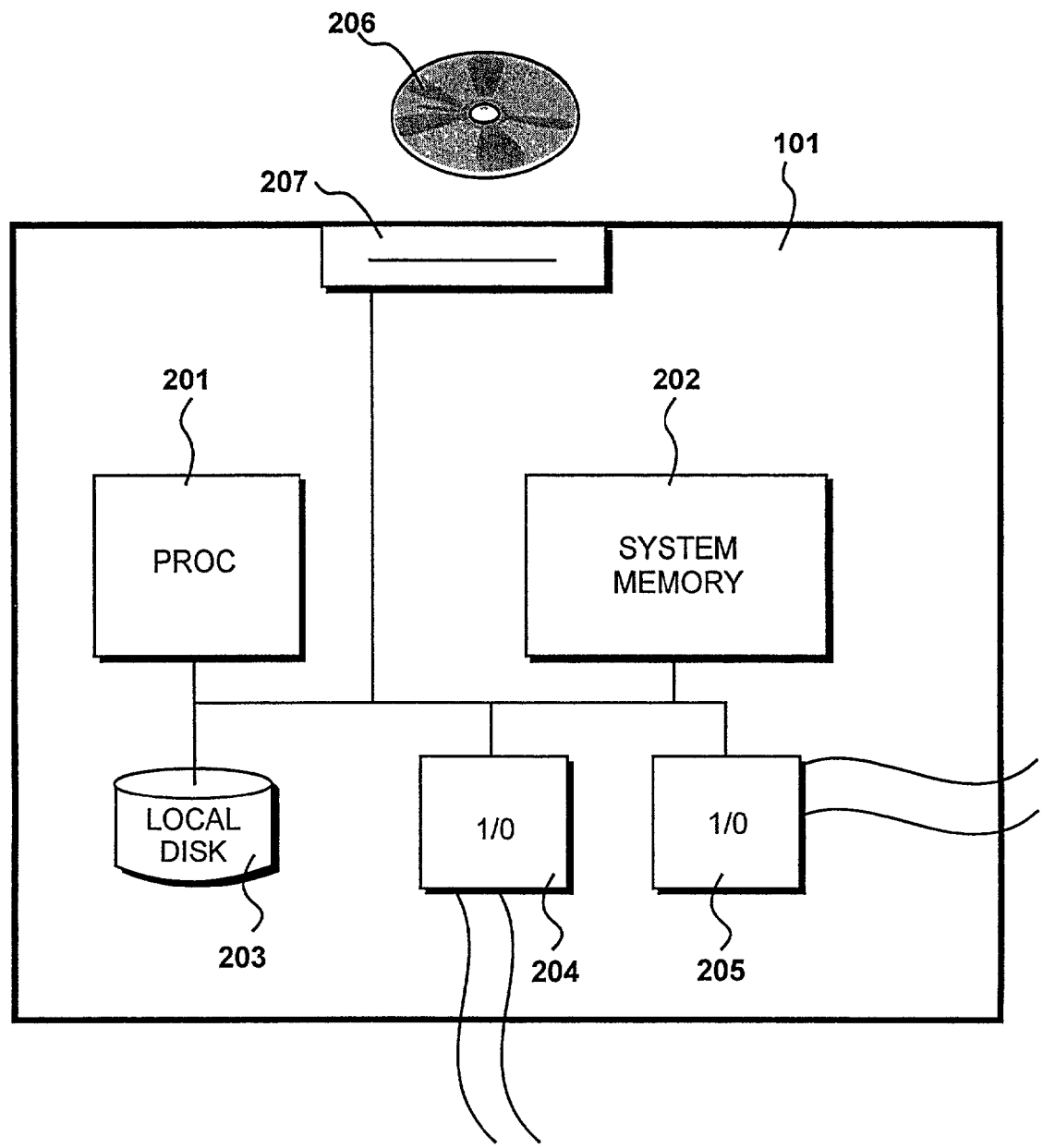
FIG. 2 details the processing system as shown in FIG. 1.

Processing system 101 is detailed in FIG. 2. The processing system includes one or more programmable processing devices 201 that communicate with a system memory 202, a local disk storage device 203, a first interface 204 for communicating with the disk storage array 103 and a second interface 205 for communicating with a keyboard 104, touch tablet 105-stylus 106 combination.

Processing device 201 operates in response to program instructions read from system memory 202. On initiation, program instructions are loaded into the system memory 202 from the local disk 203. Local disk 203 receives program instructions via data storage media such as a CD ROM 206 receivable within a CD ROM reader 207. Local disk 203 also stores metadata relating to images and projects but the actual frame-based image data is stored within the disk storage array 103.

FIG. 3

Figure 3:
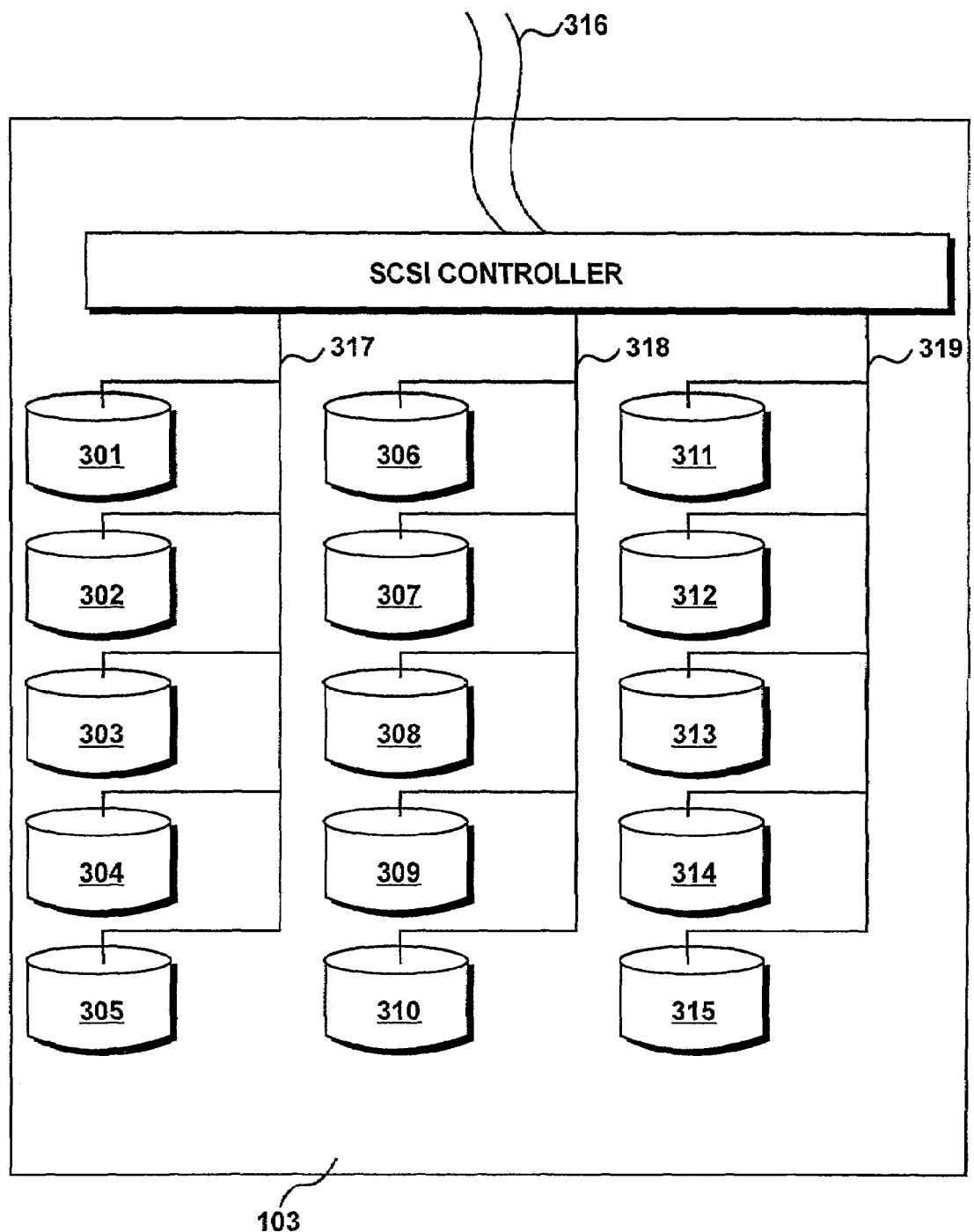
FIG. 3 details the disk storage array shown in FIG. 1.

Disk storage array 103 is detailed in FIG. 3. In this example, the array has a total of fifteen magnetic disk drives each with a storage capacity greater than fifty gigabytes, 301 to 315. Image data is received from the processing system 101 and is supplied to the processing system 101 over a SCSI interface 316 or, alternatively, a fibre channel interface (not shown). Interface 316 communicates with a SCSI controller which in turn communicates with the individual drives. In the example shown, drives 301 to 305 communicate over a first channel 317, drives 306 to 310 communicate over a second channel 318 and drives 311 to 315 communicate over a third channel 319. However, the particular groupings of disk drives in relation to individual SCSI channels will vary upon particular implementations and, in particular, upon the individual capabilities of the actual drives.

The individual frames stored on the frame storage system 103 form contiguous clips, usually derived from computer animation systems, video sources or cinematographic film sources. The frames are therefore arranged to be displayed at a particular display rate, such as thirty frames per second for NTSC, twenty-five frames per second for PAL or twenty-four frames per second for cinematographic film. Storage system 103 is therefore configured to allow these different types of frames to be transmitted at display rate or at multiples of display rate.

In addition to being displayed at different rates, and therefore requiring differing data transfer rates, the actual sizes of frames also varies for different frame formats. Thus, for example a frame of NTSC video or PAL video requires approximately one megabyte. High definition television systems require an ever-greater degree of storage capability per frame and systems capable of processing images derived from cinematographic film require a greater degree of storage per frame. The system therefore needs to be configured to allow frames to be transported at selected display rates and at selected frame definitions.

The frame storage system is optimised by dividing each image frame into a plurality of stripes and then writing each stripe to an individual disk storage device. Thus, for any frame definition and transfer rate, a formatting exercise is performed in order to group together an optimal number of individual disk storage devices. In addition, a further disk storage device is required for parity data where similar bits within each stripe are XORed together to produce a parity stream that is written to the redundant disk. In this way, the loss of data from any one disk may be reconstituted by performing the XORing process for all the remaining data. Further details are given in the present Assignee's U.S. Pat. No. 6,118,931.

Thus, the actual number of disks used for striping a particular frame will vary depending upon disk capabilities. However, for the purposes of this example, it is assumed that optimal transfer occurs when four disks are used for low definition images and when fourteen disks are used for high definition images.

FIG. 4

Figure 4:
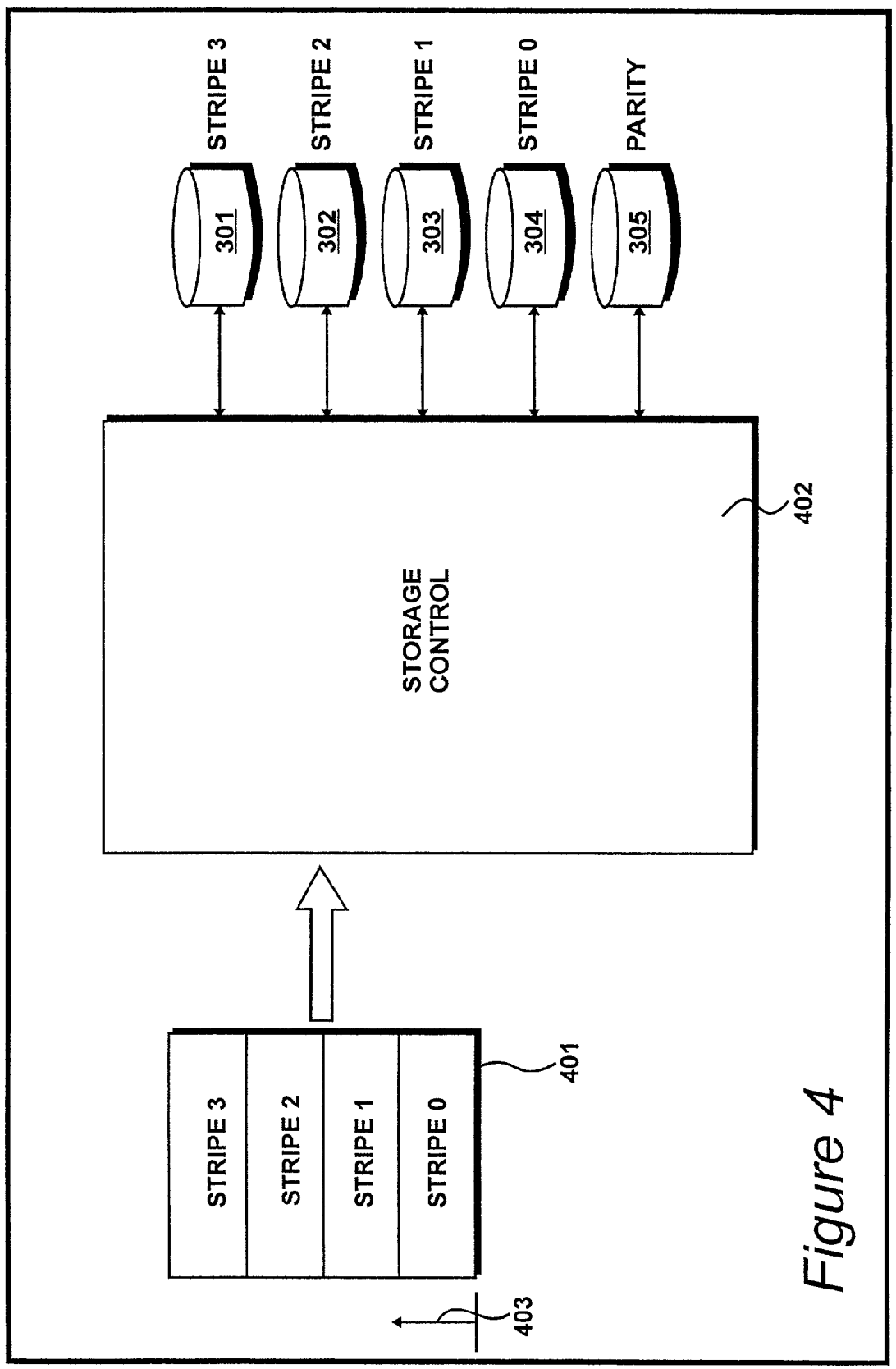
FIG. 4 illustrates a striping process.

A striping process for low definition images is illustrated in FIG. 4. An incoming frame 401 is divided into four stripes, identified as stripe zero, stripe one, stripe two and stripe three. A storage control process 402 performs an XOR operation to generate parity data. Thereafter, data is written in parallel to disks 301 to 305. Thus in this example, disk 301 receives data from stripe three, disk 302 receives data from stripe two, disk 303 receives data from stripe one, disk 304 receives data from stripe zero and disk 305 receives the parity data. The addressing of data from the stripes may identify substantially similar locations but with the application of an appropriate off-set. Thus, data is read from stripe one at the same locations as data being read from stripe zero but with an appropriate off-set as identified by arrow 403.

Having established a system of using five disks to stripe image frames as shown in FIG. 4, applications executed by processing system 101 may access the storage device but from the perspective of the application executed by processing system 101, a plurality of grouped drives operate as a single logical volume. Furthermore, alternative groupings may be established within the storage system such that for example, a first group of disks may be used to store first low definition data, a second group of disks may be used to store second low definition data and a third group of disks may be used to store high definition data.

FIG. 5

Figure 5:
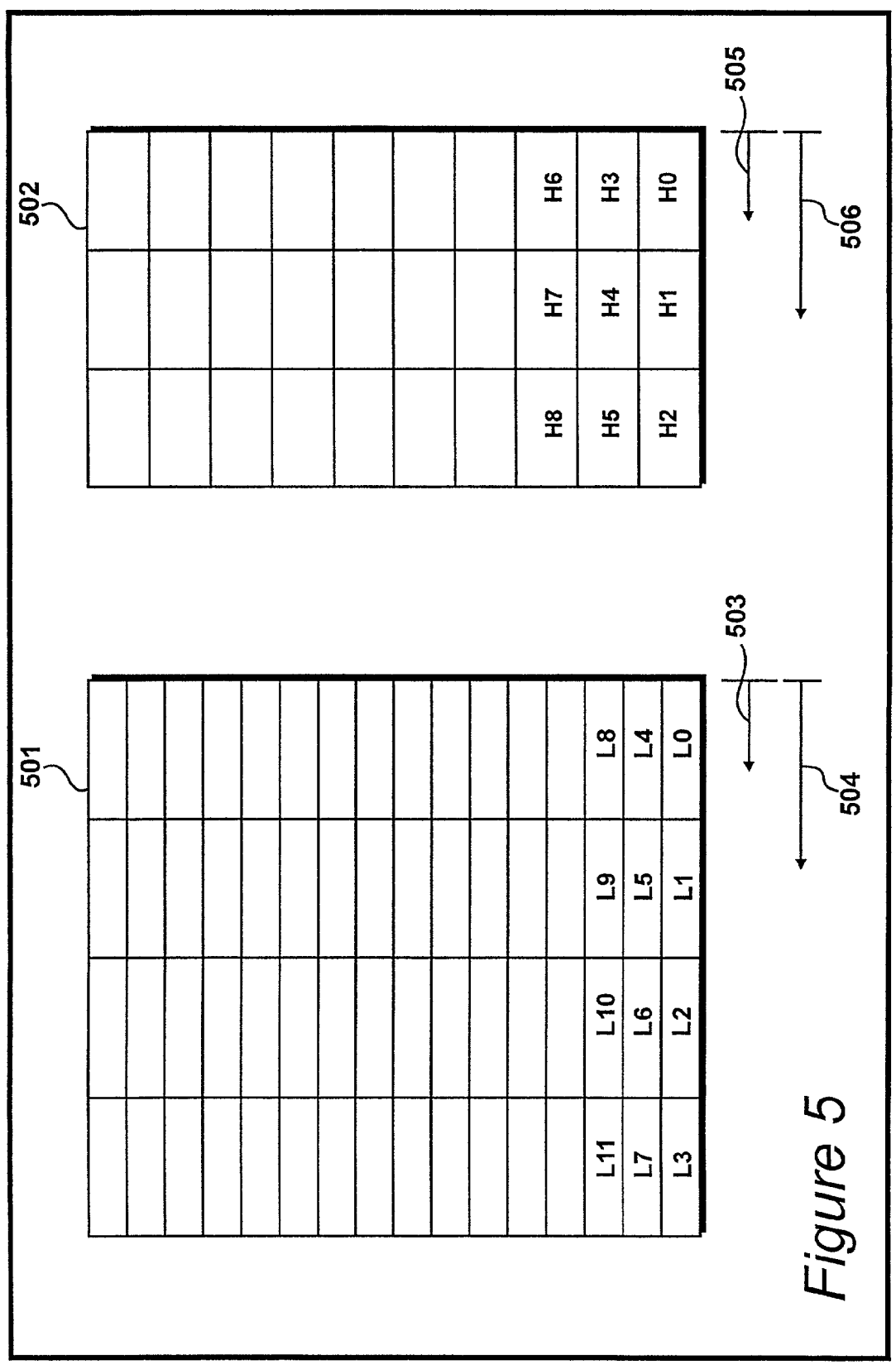
FIG. 5 illustrates the grouping of disk drives to present partitions.

An application executing on processing system 101 may also access other storage systems, such as system 103. The application would identify these two storage systems and will view them as presenting a hard partition that cannot be reconfigured. Within each of these physical volumes, soft partitions exist, relating to the grouping of individual drives configured for storing particular image data definitions. Within each of these soft partitions, the available storage is optimised for receiving frames of the particular definition under consideration. An arrangement of this type is illustrated in FIG. 5. Partition 501 has been configured for the storage of low definition frames whereas partition 502 has been configured for the storage of high definition frames. Partition 501 is presented to the application program as a unified volume but this unified volume is actually implemented using four physical devices (plus parity) as illustrated in FIG. 4. Similarly, the high definition partition 502 is implemented using fourteen physical devices (plus parity) as illustrated in FIG. 3.

The allocation of individual storage devices is selected in order to optimise the individual stripe size. However, there are limitations as to the extent to which this can be achieved such that the volume of each stripe size will tend to vary for different image definitions. Thus, as shown in FIG. 5, each individual stripe L0, L1, L2 etc has a particular volume requirement. However, when considering partition 502 it can be seen that the volume requirement for the high definition stripes is slightly larger. Thus, for a given volume totality, fewer high definition stripes may be stored.

With conventional operating systems, the number of files that may be stored on a particular volume will depend on the actual size of the individual files. For many applications, file size is variable therefore the operating system must accommodate this. Thus, in conventional operating systems it is not possible to say how many files a particular volume may store because the actual file size is usually unknown.

In partitions 501 and 502, the frame size is fixed therefore even when no data has been written to these partitions, it is possible to say how many frames can be stored. Furthermore, it is possible to identify where frame boundaries occur before data is written to the storage device and these frame boundary positions do not vary throughout the operation of the system. Consequently, such a constraint greatly facilitates frame access in that, given that the frame size remains constant and frame writing is always initiated from a pre-set starting location, it is possible to identify the start of low definition frame L1 from its frame location off-set, as identified by arrow 503. Similarly, the start of low definition frame L2 is defined by off-set 504.

In theory, it would be possible to write low definition frames to frame locations within partition 502. However, this would not make good use of the available storage because the stripes do not occupy the whole of the available space. The alternative operation of writing high definition stripes to the low definition partition would not be possible because the stripe size is not large enough.

Thus, each partition is set-up as being appropriate for a particular stripe size and then only stripes of that particular size are written to it.

Thus, again, the start of high definition frame H1 may be identified by off-set 505 and the location of high definition frame H2 may be identified by off-set 506. The system has been pre-programmed with details of the frame size (which remains constant for the partition). Consequently, when considering partition 501, an instruction to read data from off-set two, as shown by arrow 504, results in data being read from the start of low definition frame L2 because the system knows how much storage is required for the preceding frames L0 and L1. Similarly, an off-set of two in relation to partition 502 would result in high definition frame H2 being read because again the system knows how large the frames are.

This ability to quickly locate the start of individual frames within the file system significantly enhances overall performance and is identified herein as a frame-based storage system. The particular frame-based storage system illustrated herein is native to particular applications, such as FLAME, executed by the storage system 101 and is referred to herein as the native system. However, many other image processing applications are available that, although providing useful functionality to an operator, are not capable of reading the native file system and are only capable of interfacing with general purpose operating systems using documented application program interfaces.

FIG. 6

Figure 6:
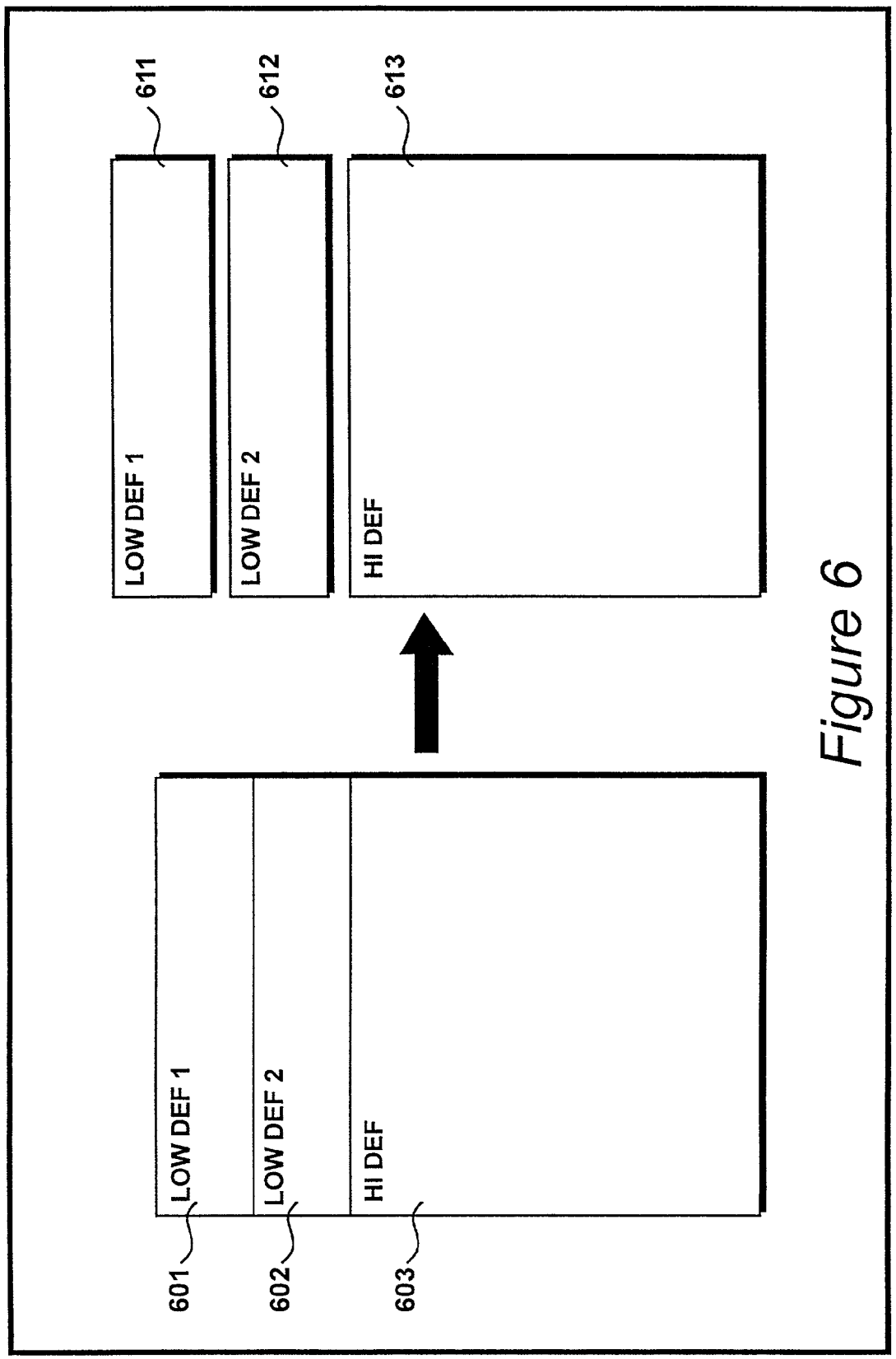
FIG. 6 shows examples of disk partitions.

Returning to the native file system, an application program will receive data from the native file system showing how the system is divided into soft partitions, as illustrated in FIG. 6. In this example, the storage system has been divided into a first low definition partition 601, a second low definition partition 602 and a high definition partition 603. As shown in FIG. 6, these may be viewed as independent and separate volumes indicated as 611 for the first low definition volume, 612 for the second low definition volume and 613 for the high definition volume. Low definition volumes 611 and 612 may also differ in the exact nature of the frame written thereto. Thus, for example, low definition volume 611 could be configured to store NTSC frames and low definition volume 612 could be configured to store PAL frames. Any clips of NTSC video may be written to volume 611. Similarly, any clip of PAL video may be written to volume 612 and any clip of high definition video may be written to volume 613. However, it is not possible to mix these volumes such that, for example, it is not possible to write NTSC frames to volume 612 because this volume has been specifically formatted for the storing of PAL frames.

FIG. 7

The facility allows source material of many formats to be manipulated under the control of applications accessing the native file format directly and under the control of other applications. After considering each logical partition, specified in terms of its image size and format etc, within each of these partitions a number of individual projects may be stored. Thus, when conducting a particular operation, an operator would be concerned with a single project. Before the operator can work on this project, it is necessary for source material to be captured and when the operations have been completed, the material is exported, thereby freeing-up space within the storage system.

Figure 7:
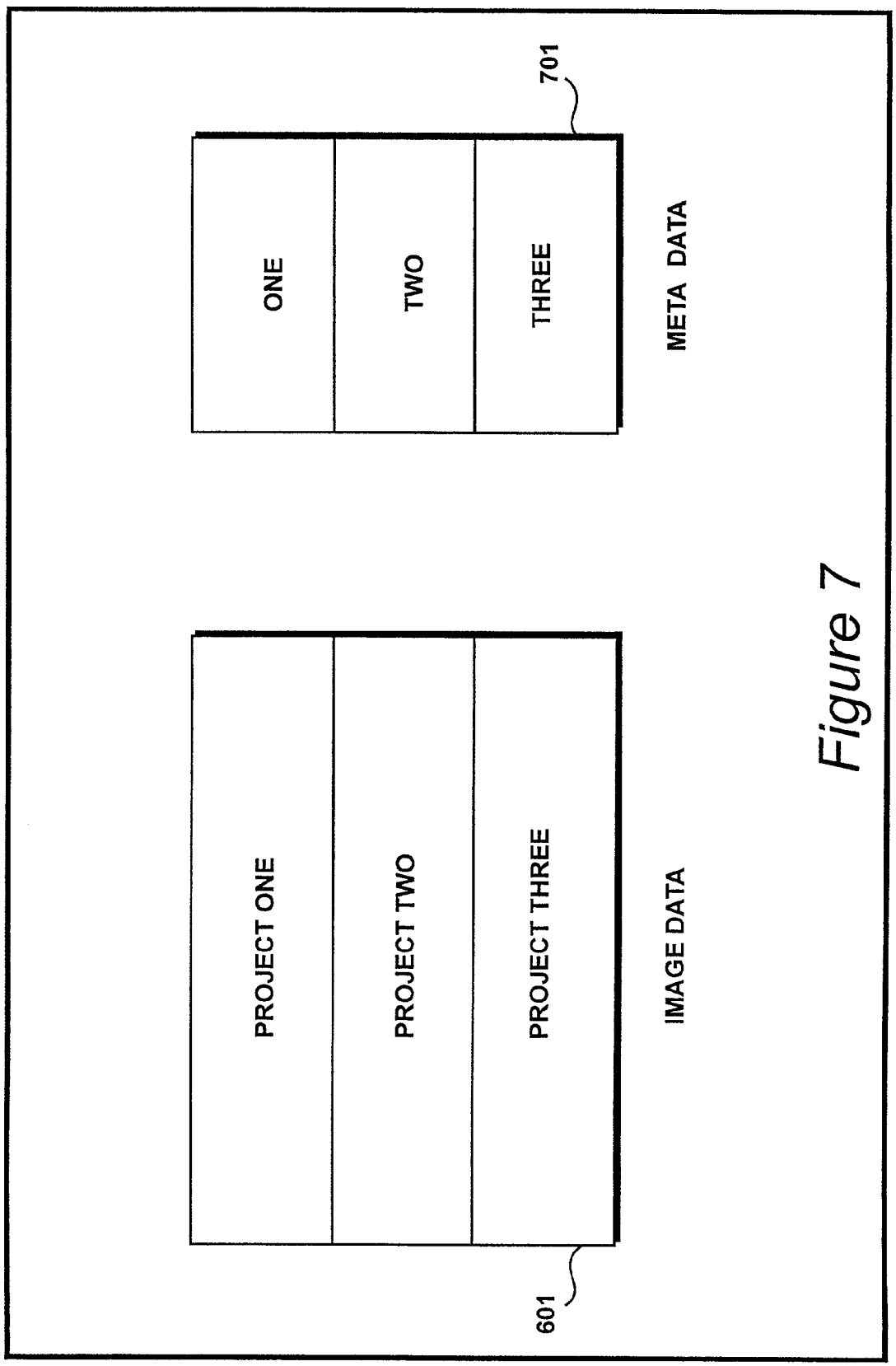
FIG. 7 shows the low definition partition identified in FIG. 6.

Low definition partition 601 is illustrated in FIG. 7. In this example, three completely independent sets of image data have been stored in this partition, identified as Project One, Project Two and Project Three. In FIG. 7, these projects are shown as occupying distinct regions within the partition but in reality the data could be dispersed anywhere within the partition and logical sub-partitions do not exist, thereby allowing optimum use of the storage facility to be made. In order to maintain a record of where image data for a particular project resides within the partition, metadata 701 is stored for each of the projects. Thus, Project One has metadata One, Project Two has metadata two and Project Three has metadata Three. This metadata is not stored on the file system itself, primarily because this would be inconsistent with the formatting of the storage system as illustrated in FIG. 5. Consequently, the metadata 701 is stored on the local disk.

FIG. 8

Figure 8:
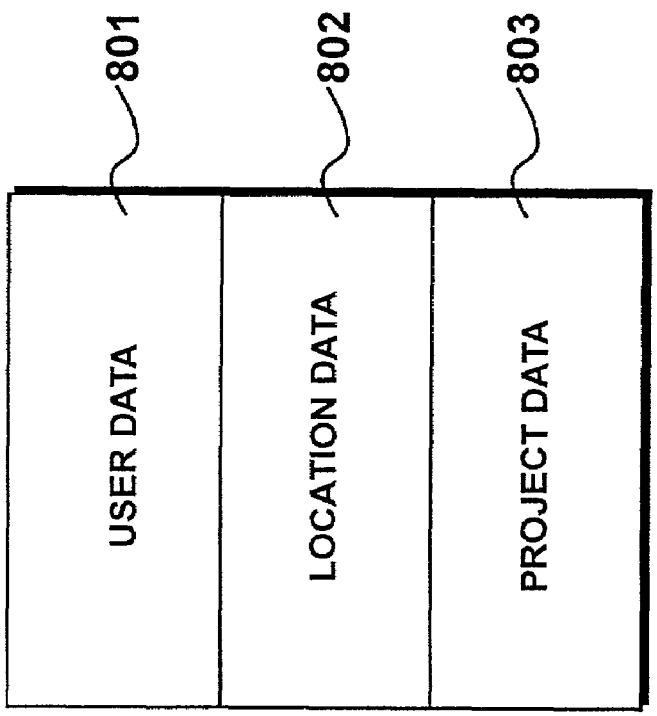
FIG. 8 details metadata identified in FIG. 7.

The first set of metadata (ie metadata one) 701 is illustrated in FIG. 8. The metadata for Project One consists of user data 801, project data 802 and location data 803. These data types would also be included for Project Two and for Project Three. User data 801 defines user preferences and ensures that each user is presented with a familiar environment.

Figure 9:
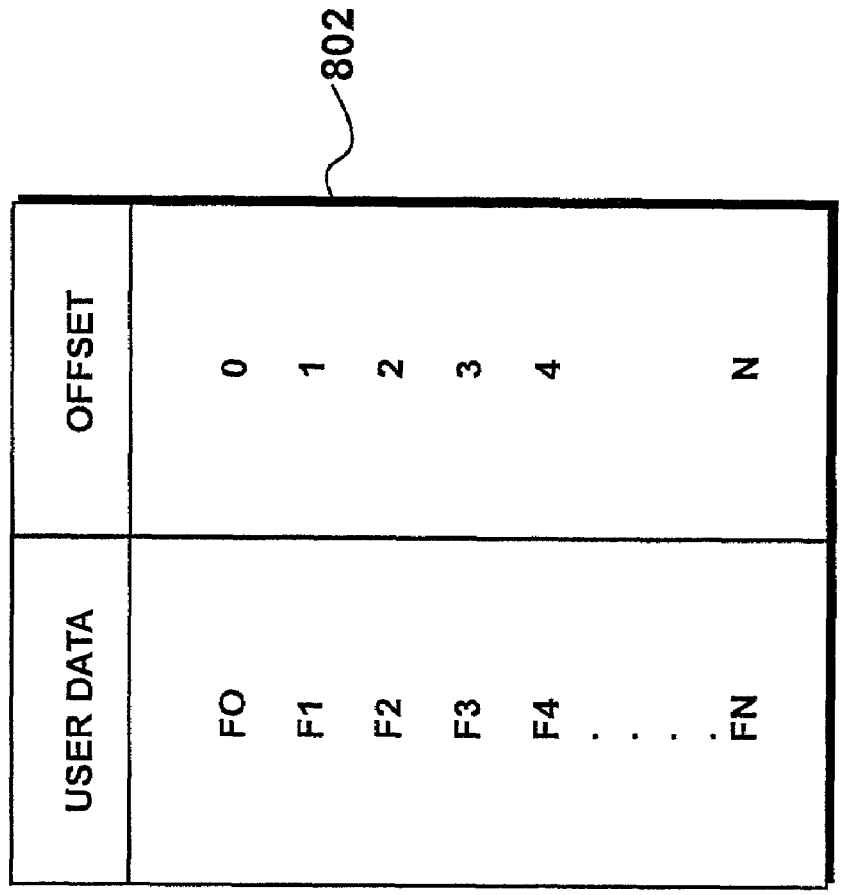
FIG. 9 details location data identified in FIG. 8.

Location data 802 is detailed in FIG. 9.

FIG. 9

The location data 802 identifies the physical location of each image frame within the frame storage system. Each frame within the environment has a unique frame identification, illustrated in FIG. 9 as frame ID F0, F1, F2 etc. The location of the frame within the frame storage volume is then identified by an off-set, as illustrated in FIG. 5. Thus, in this example, frame F0 is the first frame in the volume and has an off-set of zero. Frame F1 is the second frame with an off-set of one, frame F2 is the third frame with an off-set of two and frame F3 is the fourth frame with an off-set of three etc. Thus, as previously described, given that frames within the partition take up the same space, relatively little information needs to be stored in order to uniquely identify the start of a particular image frame within the storage system.

It is not, for example, necessary to identify the number of blocks of data or the number of disk sectors that are used for a particular frame because each frame takes up the same amount of space. As previously stated, this is significantly different from general purpose storage environments and therefore explains why applications using general purpose API's cannot access the native storage system directly.

FIG. 10

Figure 10:
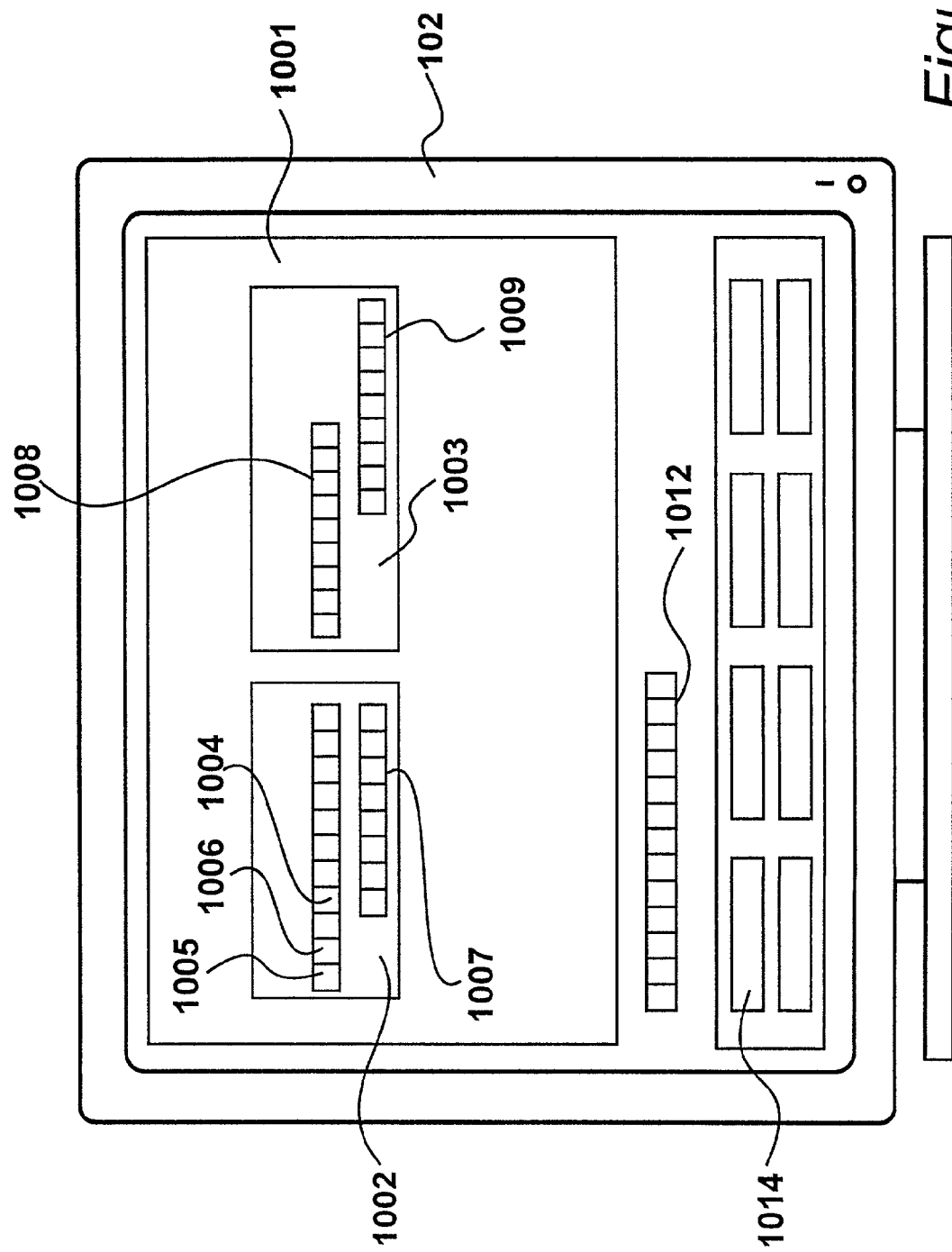
FIG. 10 illustrates a graphical user interface for the native file system.

Project data 803 (shown in FIG. 8) stores data defining how the actual image data is presented to a user. Furthermore, this data is updated as operations and modifications are performed by a user. This data is used to present a graphical user interface to a user, as illustrated in FIG. 10. The interface is displayed on monitor 102. For each project one or more desktops may be stored and a first desktop 1001 is illustrated in FIG. 10. This desktop includes (in this example) a first reel 1002 and a second reel 1003. In conventional video editing, source material is received on reels. Film is then spooled off the reels and cut into individual clips. Individual clips are then edited together to produce an output reel. Thus, the presence of reels 1002 and 1003 may provide a logical representation of original source material and this in turn facilitates maintaining a relationship between the way in which the image data is represented within the processing environment and its actual physical realisation.

In this example, a first clip 1004 is held on reel 1002. This clip includes individual frames 1005 and 1006 etc. Reel 1002 also includes a second clip 1007.

A third clip 1008 is stored on reel 1003, along with a fourth clip 1009. In addition, the project includes a seventh clip 1012 outside the desktop.

The user interface as shown in FIG. 10 also includes function buttons 1014 allowing an operator to select particular operations to be performed on clips. Particular frames and clips are selected by an operator in response to manual operation of the stylus 106. Thus, within the user interface shown in FIG. 10, frames and clips may be selected and dragged within the display so as to effect operation by a particular process.

Processes responsive to the user interface shown in FIG. 10 are capable of accessing the native file system directly. However, other application programs are stored on local disk 203 that, although useful to an operator, are not capable of accessing the native system directly and require file translation in order for them to operate upon the image data.

FIG. 11

Figure 11:
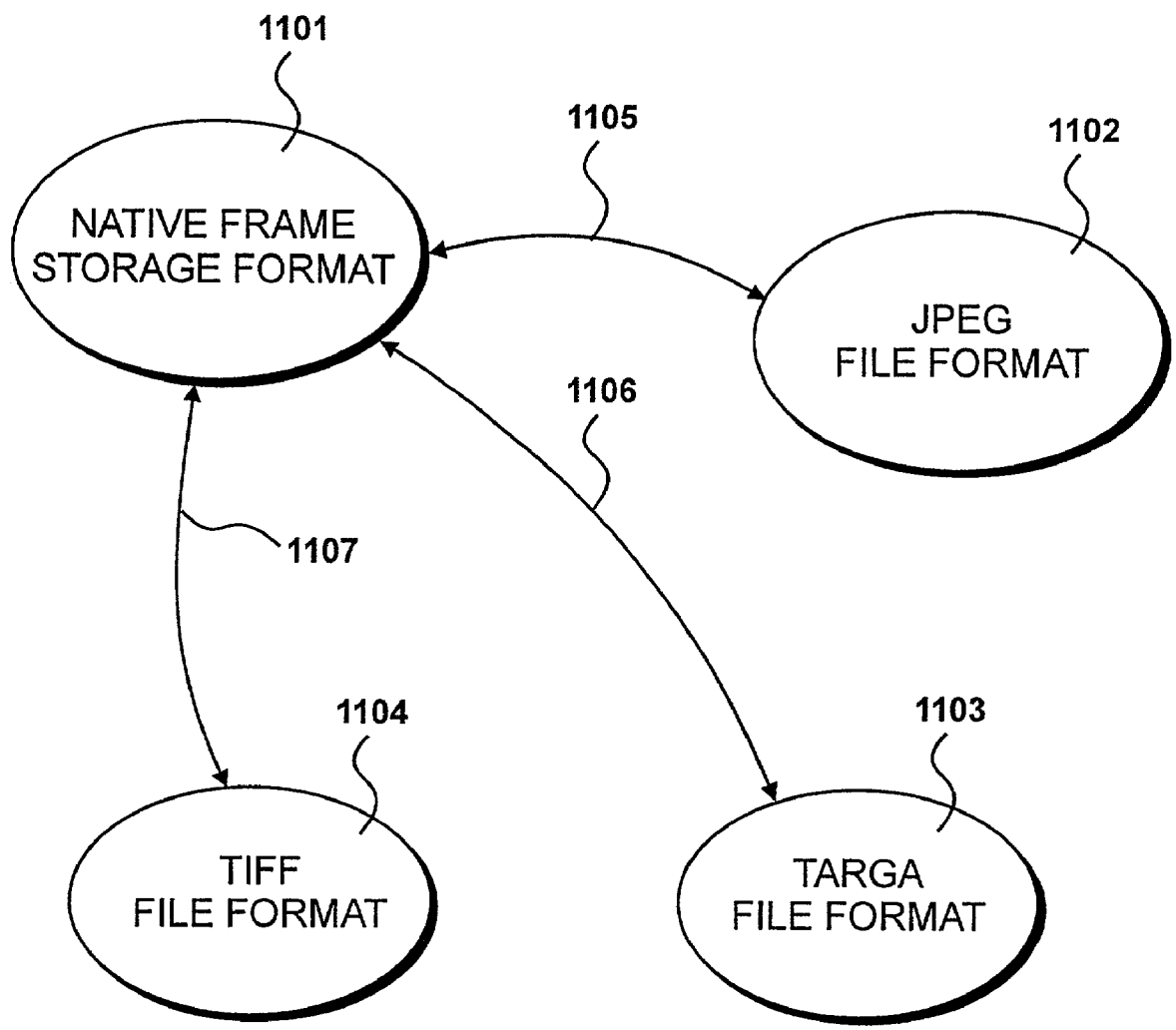
FIG. 11 illustrates relationships between file formats.

An illustration of file format relationships is shown in FIG. 11. Native applications, shown generally at location 1101, are capable of operating directly in the native file format. Other applications, shown generally at 1102, operate upon the JPEG file format, a compressed image format the protocols for which were set out by the Joint Picture Expert Group. Applications shown generally at 1103 operate on files stored in the TARGA file format, whereas applications shown generally at 1104 operating on files stored in TIFF (True Image File Format) format.

In order for applications at 1102 to operate upon the image data, a translation from the native file format must occur as indicated by arrow 1105. Similarly, if applications 1103 are to be used, a translation must occur from the native file format as illustrated by arrow 1106 and if applications 1104 are to be used, a translation from the native file format must be formed as illustrated by arrow 1107.

If an operator knows that a particular clip is to be processed using an application that requires a different file format, it is possible for the operator to export selected files such that an appropriate translation occurs. The operator may then load the alternative application and read the data in its appropriate format. However, the present invention allows an operator to execute an alternative program and to read data directly from that program, where it appears in the appropriate format, but is actually being read from the native file format and translated on the fly as individual frames are required. However, in order to achieve this, it is necessary for the alternative program to be presented with a view of the file structure that is consistent with its conventional protocols. In order to achieve this, the protocols of the network file system and in particular NFS2 are deployed such that alternative applications may interrogate the storage system using conventional NFS commands. A storage control process is then configured to interface with these NFS commands, generate data for a file system view to be seen at the alternative application, by interrogating metadata and then, when selected, provide actual image data in the required format by accessing the image data.

A sub-set of the NFS2 commands are implemented by the system such that the system will respond to these commands when issued by another process or by a separate system connected over a network. The sub-set of commands implemented by the system are as follows:
LOOK UP
READ DIRECTORY
GET ATTRIBUTES
READ FILE
GET STATISTICS

FIG. 12

Figure 12:
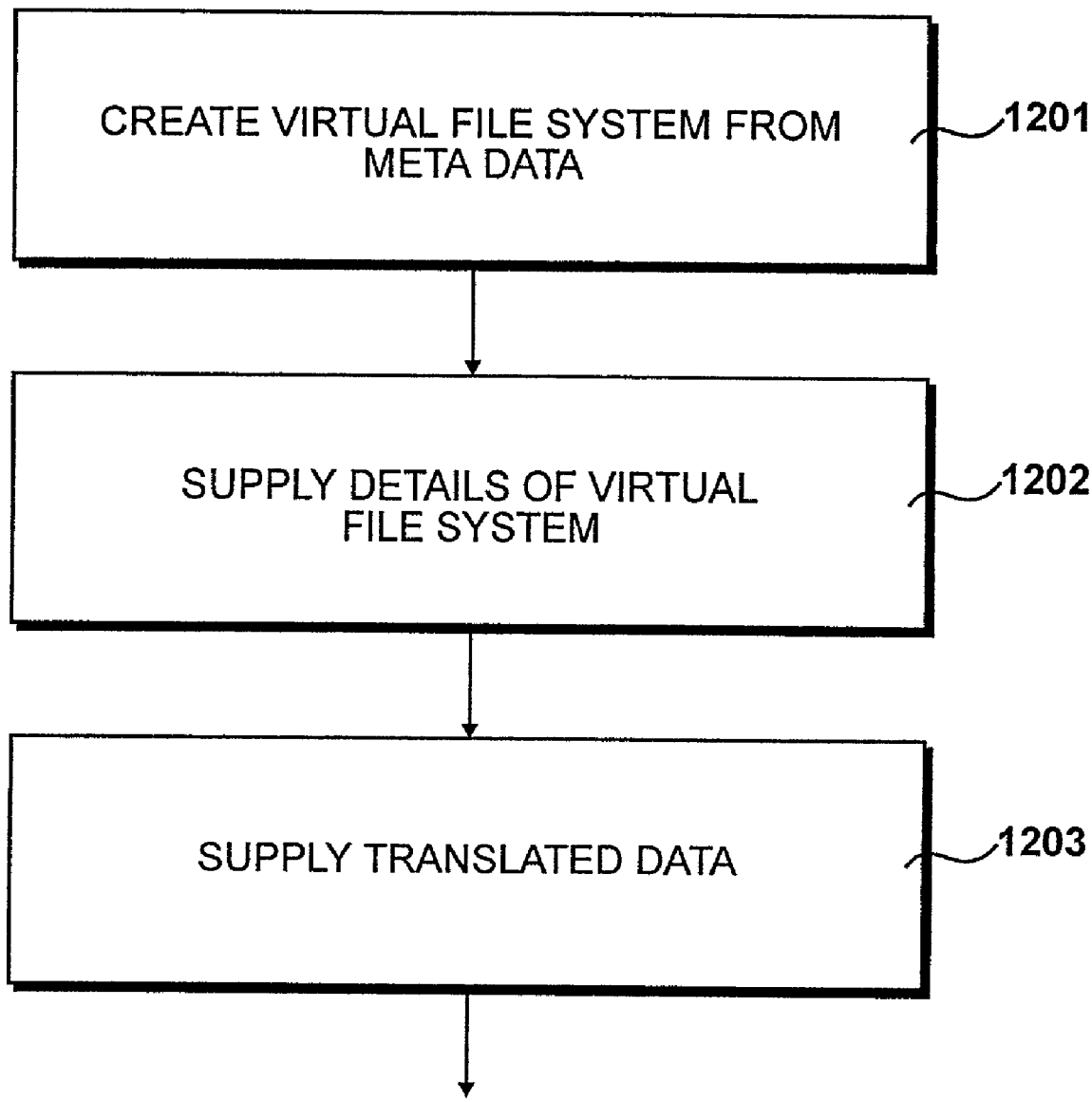
FIG. 12 identifies procedures performed by the processing system.

Procedures performed by the processing system in order to make image data available in alternative formats is illustrated in FIG. 12. At step 1201 a virtual file system is created by examination of metadata 701.

At step 1202 details of the virtual file system are supplied to a requesting application or networked system. These details are obtained from the virtual system created at step 1201 and, where necessary, with reference to the actual stored data itself.

At step 1203 image data is translated and supplied to requesting process or system.

Figure 13A:
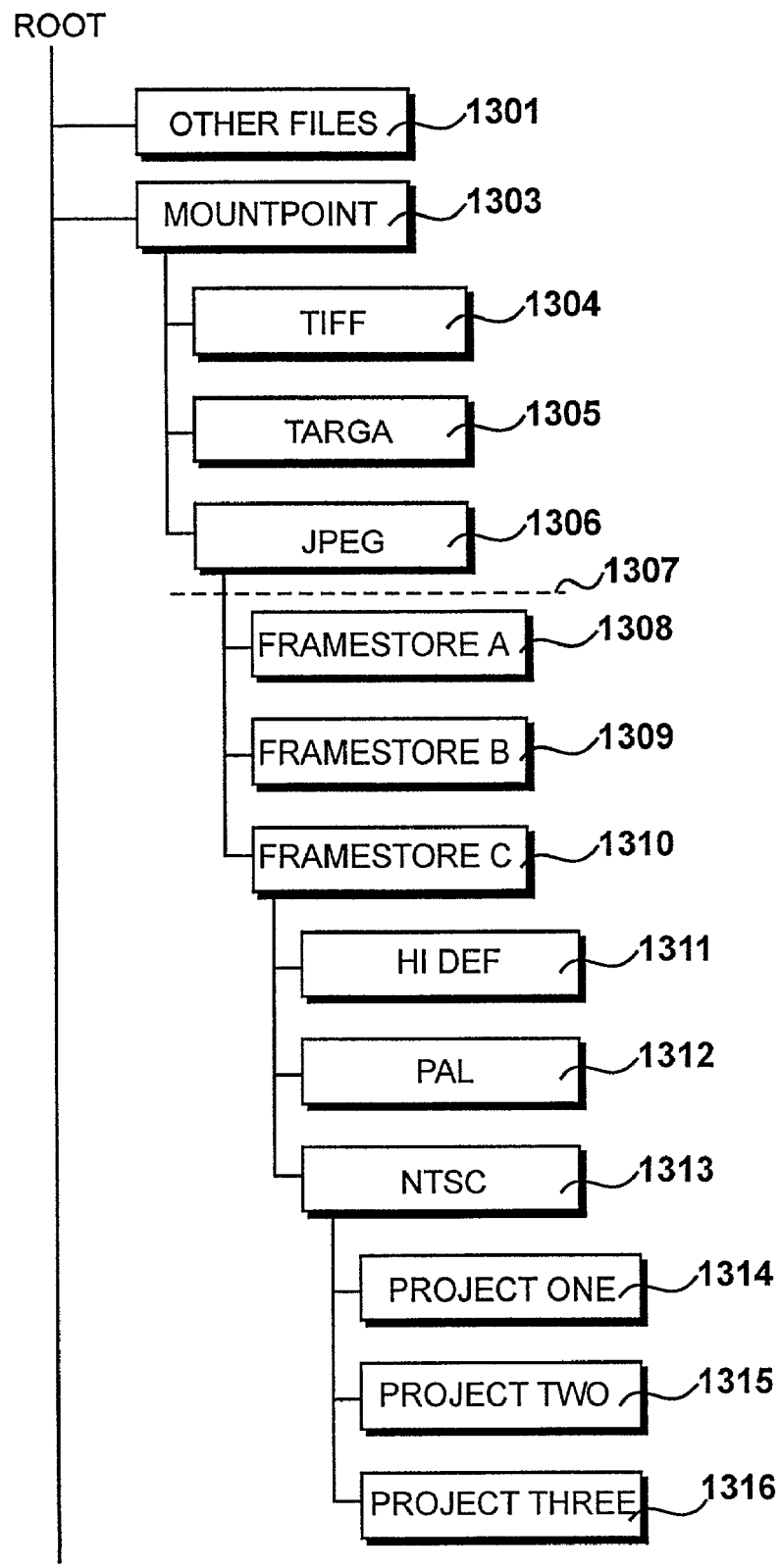
FIGS. 13A and 13B illustrate a virtual file system.
Figure 13B:
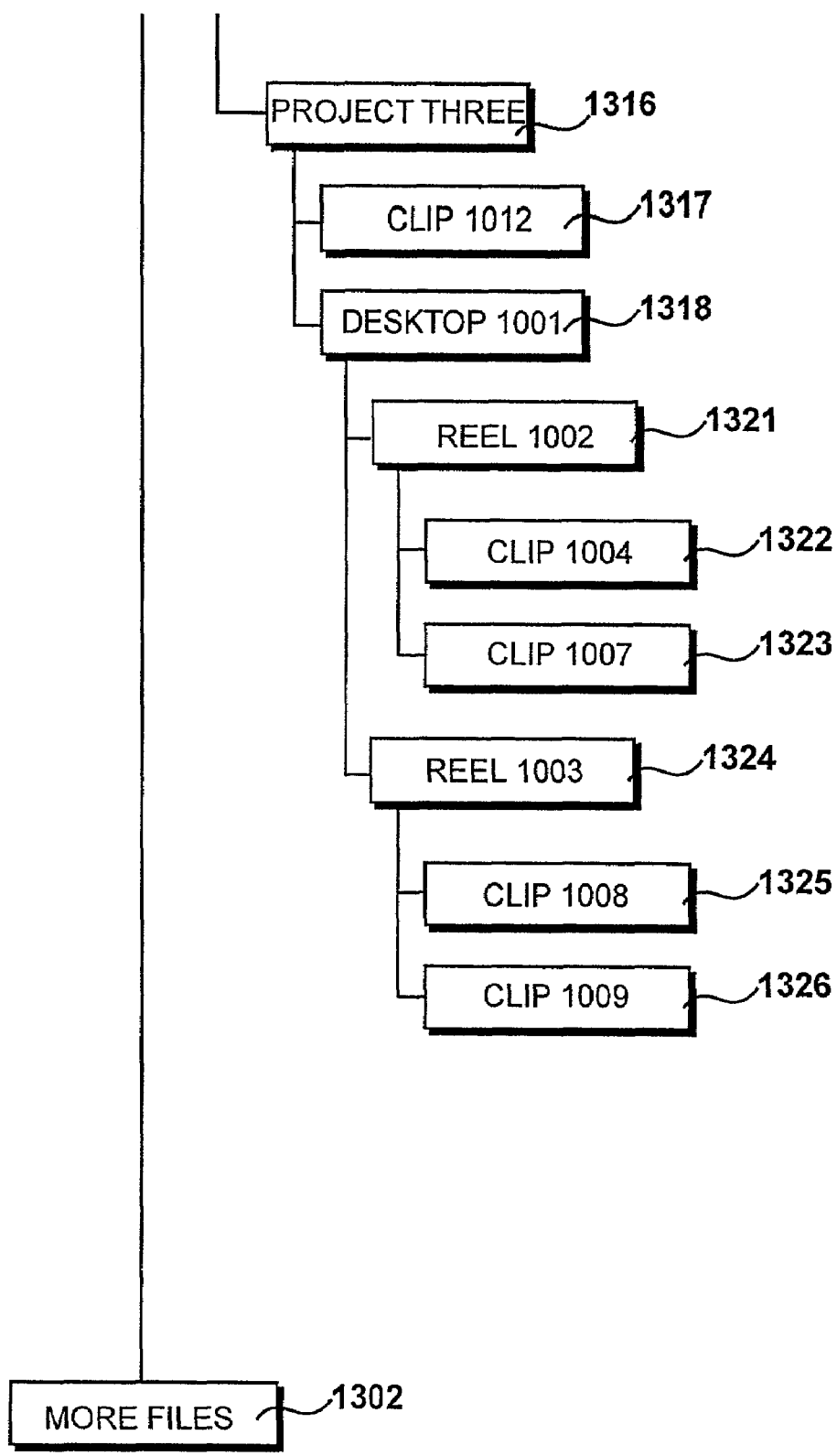

FIGS. 13A and 13B

A virtual file system created from metadata 701 is illustrated in FIGS. 13A and 13B. The virtual file system allows processor 201 to generate output signals that are supplied to display device 102 such that said display device may display a view of stored frames in which the stored frames are actually stored, on storage device 103, in the native frame format but appear in the view as if stored in an alternative format.

When operating within the alternative application, a view of the available storage is presented to a user as illustrated in FIGS. 13A and 13B. Directory 1301 stores other files and more files are stored in directory 1302. These may include alternative application programs and data relevant to alternative application programs.

Files produced by the present embodiment, appear as if within a specific directory 1303 identified in this example as "MOUNTPOINT". Below mountpoint directory 1303 a plurality of sub-directories may be included each referring to a specific file format. In this example, three alternative file formats are available and the system presents a view such that TIFF files appear as if in directory 1304, TARGA files appear as if in directory 1305 and JPEG files appear as if in directory 1306.

The system includes further levels of sub-directories below dotted line 1307. The structure below line 1307 is constructed only once and then appended to a selected format directory 1304 to 1306. In the example shown, format directory JPEG 1306 has been selected therefore the structures appears to be as if appended to this directory. When an actual file is located, the file will be presented as if in JPEG format. Similarly, if directory 1304 were to be selected, the structure below line 1307 would be appended to directory 1304 and all files would then be presented as if being in the TIFF format. However, in accordance with the preferred embodiment, the same structure is being used on each occasion and when selected, file translation occurs on the fly.

The next layer of directories represents the hard partitions for individual frame stores. Thus, access to frame store A is provided via subdirectory 1308, access to frame store B is provided by subdirectory 1309 and access to frame store C is provided by sub-directory 1310.

In the particular example shown in FIG. 13A, frame store C has been selected and this in turn provides three further sub-directories representing the existence of the soft partitions. Thus, sub-directory 1311 provides access to soft partition 613 having high definition frames therein. Similarly, sub-directory 1312 provides access to soft partition 612 having PAL frames therein and access to soft partition 611 having NTSC frames therein is provided by sub-directory 1313.

In this example, sub-directory 1313 has been selected which in turn makes available access to the three projects shown in FIG. 7. Thus, data for Project One is provided via sub-directory 1314, access to Project Two is made available through sub-directory 1315 and access to Project Three is made available through sub-directory 1316.

In the example shown in FIG. 13B, Project Three has been selected and further levels of sub-directories are created based on the project data 803. Thus, in the native format project data 803 is presented to a user in the form of the interface shown in FIG. 10. However, when using conventional applications with conventional file structures, the same data is presented to the user in the form of a structure as shown in FIG. 13B.

Access to clip 1012 is provided by means of sub-directory 1317 and a sub-directory 1318 provides access to the desktop 1001. Within the desktop, reel 1002 is represented by sub-directory 1321, clip 1004 is represented by sub-directory 1322 and clip 1007 is represented by sub-directory 1323.

Reel 1003 is represented by sub-directory 1324, clip 1008 is represented by sub-directory 1325 and clip 1009 is represented by sub-directory 1326.

A constraint of the system is such that an actual data file can only be contained within a clip sub-directory therefore it is not until a clip sub-directory has been interrogated that access can be made to individual files. This constraint simplifies the generation of the virtual file structure as illustrated in FIGS. 13A and 13B.

FIG. 14

Figure 14:
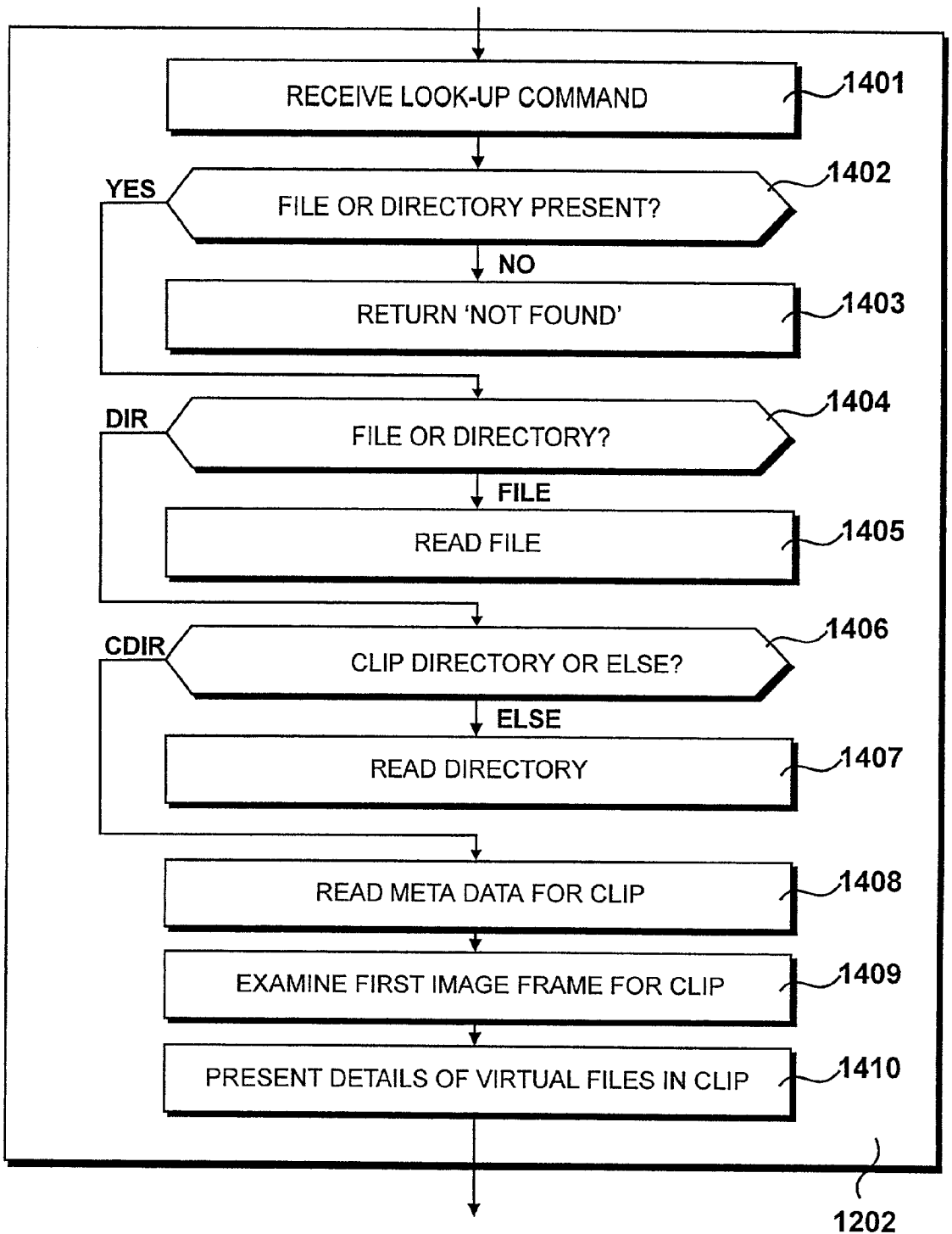
FIG. 14 shows procedures for supplying details of a virtual file system identified in FIG. 12.

Procedures 1202 for supplying details of the virtual file system are detailed in FIG. 14. At step 1401 the process receives a look-up command (part of the NFS protocols) whereafter the virtual file system is examined to identify the relevant entity, which is either a file or a directory. At step 1402 a question is asked as to whether the relevant entity has been identified. If a corresponding entity has been identified, the procedure proceeds to the next step 1404. Alternatively, if a corresponding entity cannot be identified, then an error message is generated at step 1405, which indicates that the entity cannot be located.

At 1404 a question is asked as to whether the relevant entity is a file or a directory. If a file is identified then it is read at step 1405. Alternatively, if a directory has been identified, the procedure is directed to step 1406 wherein a question is asked as to whether the directory is a clip directory or another directory. If a directory other than a clip directory is identified then it is read at step 1407. Alternatively, if a directory has been identified as a clip directory, the procedure is directed to step 1408.

Although directories are present within the virtual file system, actual files do not exist within this system. However, upon examining a clip within the file structure, a user will expect to encounter actual files.

The presentation of files in a view may be generated without referring to the actual image data itself but, as an alternative, by referring to the metadata. Thus, the project data 803 identifies the relationship between files and directories. However, there is very little additional data concerning the image frames that is stored within the metadata. Thus, if a user requires further information, possibly by the issuance of a GET ATTRIBUTES command, further interrogation of the actual file data is required.

At step 1408 metadata for the clip is read allowing the process to identify the number of frame files that are present within the clip.

At step 1409 a first image frame of the clip is examined to identify further information about the frames contained within the clip. In particular, an examination of a first image frame enables the process to identify the size of that frame. Thereafter, the process assumes that all other frames will have a similar size.

At step 1410 details of the virtual files are displayed to the requesting process.

FIG. 15

Figure 15:
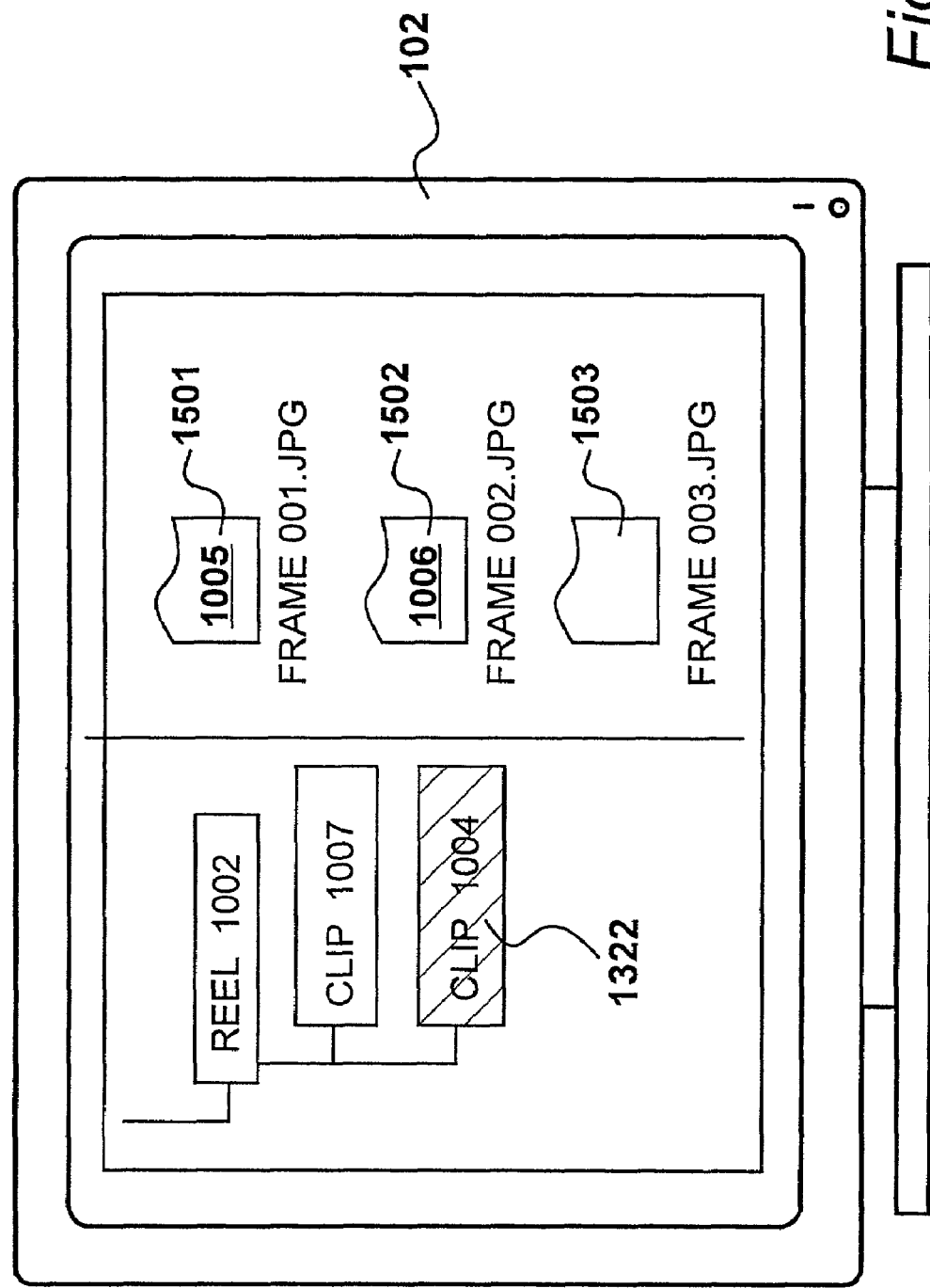
FIG. 15 shows a display of the virtual file system.

The file format generated at step 1201 may be examined and viewed on display 102 as shown in FIG. 15. In the example shown in FIG. 15 directory 1322 has been selected and is shown highlighted. The process reads the metadata for the clip at step 1408 and then presents a view of frames by icons 1501, 1502 and 1503 etc. Each of these frames is represented as being a JPEG frame given that JPEG sub-directory 1306 has already been selected. Had the user selected TARGA directory 1305, icon 1501 would be represented as a TARGA file. Similarly, had a TIFF format been selected, by the selection of directory 1304, icon 1501 would represent frame 001 as a TIFF file. None of these files exist and the same directory structure is presented for each of the file formats.

It is now possible for a user to select one or more of the displayed files resulting in execution of process 1203 to translate these files.

FIG. 16

Figure 16:
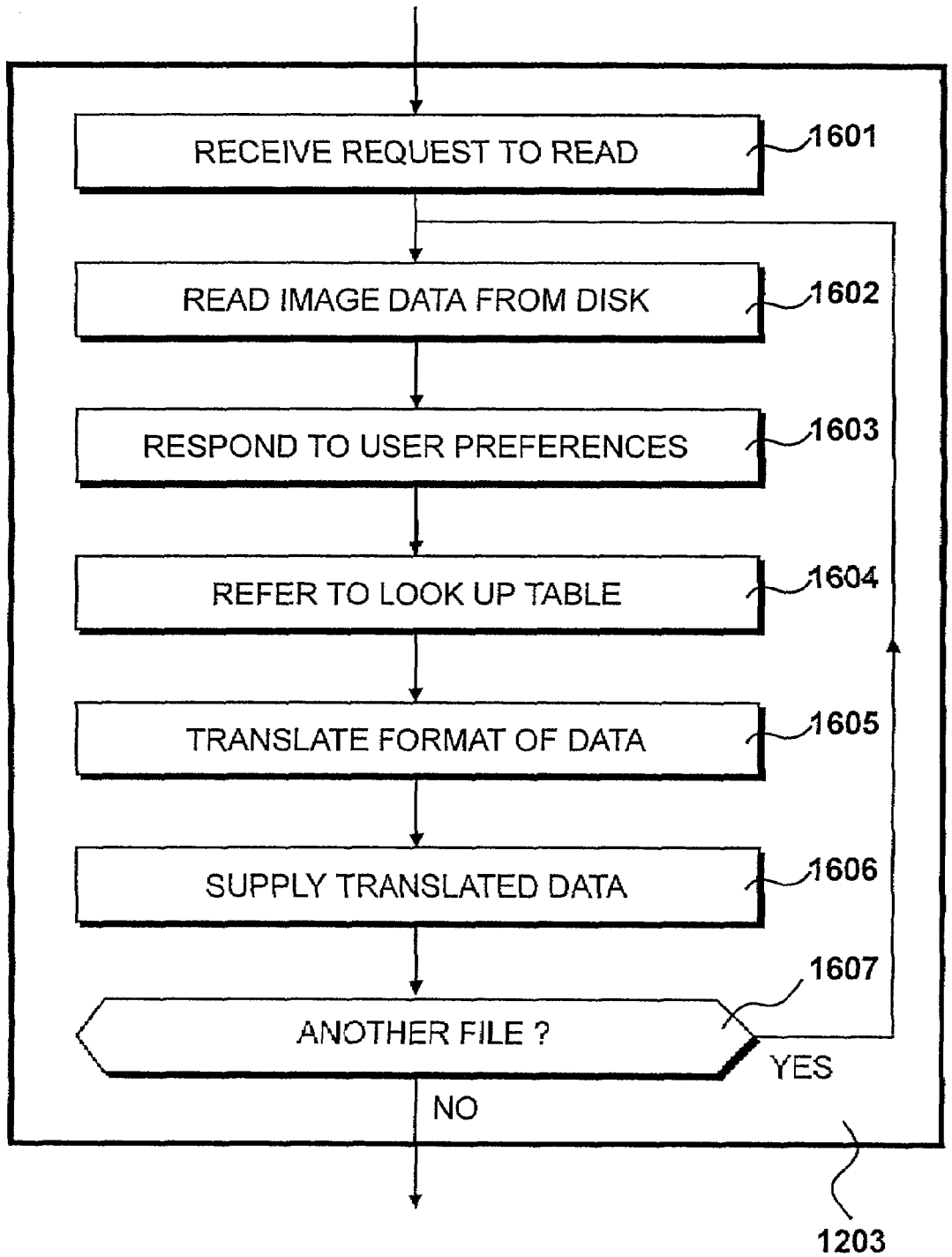
FIG. 16 details procedures for the translation and supply of image data identified in FIG. 12.

Procedure 1203 for the translation and supply of image data is detailed in FIG. 16.

At step 1601 a request to read data is received and at step 1602 the image data is read from disk. Thus, in response to a file being requested an image frame is read at step 1602.

Step 1603 allows the process to respond to user preferences. These user preferences control the way in which the data is actually translated on the fly. Consequently, their presence would have no meaning if real files existed. However, given that the files are being translated as and when required, this allows an additional layer of functionality to be included in that, to some extent, a user may control the way in which the translation process takes place.

A typical example of a user preference would relate to the way in which compressed files are processed. Thus, when generating JPEG files for example, a user may specify an optimum level of compression. In this way, a user could place constraints on file size or place constraints on an acceptable level of image degradation.

At step 1604 reference is made to a look-up table. The requirement for a look-up table will vary depending upon the actual file translation that occurs. However, simple translations may be effected very quickly if reference is made to a look-up table which, for example, may adjust the gamma of an image or may invert the components of an image. This approach is particularly useful when images have been scanned from cinematographic film so as to compensate for any non-lineararities.

At step 1606 translated data is supplied to the requesting process whereafter at 1607 a question is asked as to whether another file is to be translated. Thus, when answered in the affirmative, control is returned to step 1602.

FIG. 17

The system of the first preferred embodiment is implemented locally in which applications being executed by the same processor, ie processor 201, select first image frames in a native format and select second image frames in an alternative format.

Figure 17:
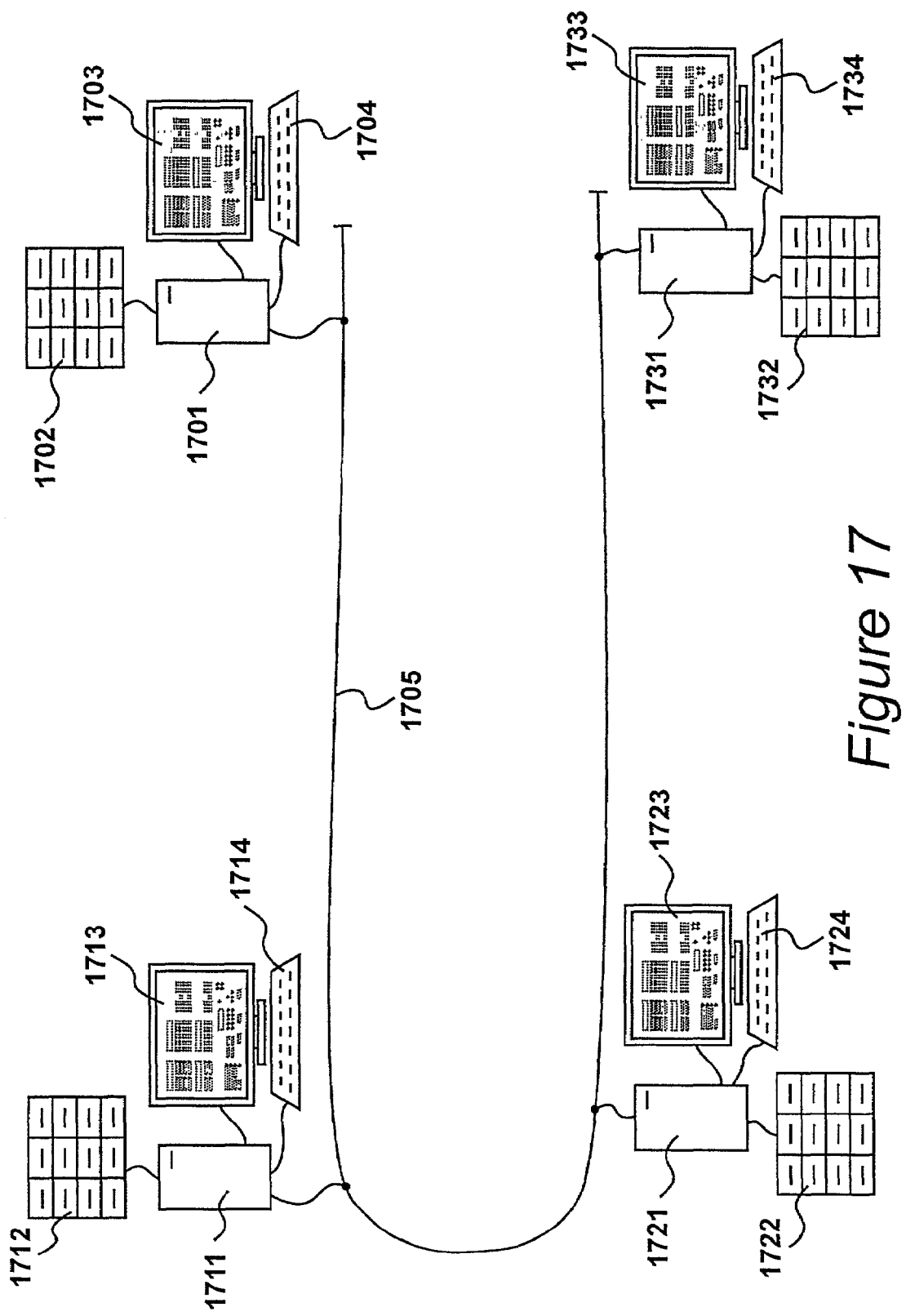
FIG. 17 shows an alternative embodiment of networked processing systems.

In an alternative preferred embodiment, a data conveying network is provided as illustrated in FIG. 17. A first processing station 1701 has a first frame storage system 1702, provides output signals to a display device 1703 and receives input commands from a keyboard 1704. A network 1705 provides a communication to a second processing station, a third processing station and a fourth processing station. At the second station a second processing system 1711 communicates with a second frame storage system 1712, an output display 1713 and an input keyboard 1714. Similarly, a third station includes a third processing system 1721, a third frame storage system 1722, a third display 1723 and a third keyboard 1724. A fourth station, again connected to the network 1705, includes a fourth processing system 1731, a fourth storage system 1732, a fourth output display 1733 and a fourth keyboard 1734.

In this example, it is assumed that the first storage system 1702 has been formatted in a way substantially similar to storage system 103, in that it has a native frame-based storage system as previously described. The second processing system 1711 is using an alternative application and as such requires image files in a TIFF file format accessible over a conventional file-based system.

Processing system 1701 reads image data from its frame storage system 1702 in a native format. It reads its local metadata and from this simulates a file system structure such that a representation of this file system structure may be read by processing system 1711 over network connection 1705.

In response to the operation of keyboard 1714 while viewing an image on monitor display 1713, processing system 1711 responds to a selection defined by a user for particular image frames. Thus, based on the information generated over the network, a clip of TIFF frames are selected, whereas the actual data only exists as frame-base data on frame storage system 1702.

Processing system 1711 identifies frames selected at processing system 1701 and reads the selected frame in the native format. Thereafter, the frames read from storage system 1702 are translated into TIFF file format and thereafter transmitted over the network 1705.

Thus, in this way, it is possible for files to be transferred over network connections where a recipient system operates in accordance with conventional NFS protocols. However, on the native system, a virtual file system is synthesised and format translation occurs when an actual file has been selected.

What is claimed is:

1. Image data processing apparatus, comprising:
   programmable processing means including interface means for receiving input signals from an input device and for supplying output signals to a display device;
   image frame storage means having an array of a plurality of storage devices, wherein each storage device is configured to store image frames of a predetermined definition that is a native format for said storage device; and
   program instruction storage means configured to supply program instructions to said processing means;
   wherein:
   first selected image frames are read from said frame storage means and modified after translation into an alternative format in response to a first program; in which
   said processing means produces output signals to said display device to display a view of stored frames in said first program, wherein said stored frames are stored in said native format but appear in said view to said first program as if stored in said alternative format; and
   upon receiving input signals, from said first program, selecting a displayed frame, said processing means translates on the fly as said displayed frame is required by said first program, said selected stored frame into said alternative format and supplies said translated frame to said first program.

2. Image data processing apparatus according to claim 1, wherein said image frames have a definition defined in accordance with NTSC, PAL, high definition or cinematographic standards.

3. Apparatus according to claim 2, wherein said image frames are stored in uncompressed form.

4. Apparatus according to claim 1, wherein said native format optimises storage requirements for a particular image definition.

5. Apparatus according to claim 1, wherein a view of stored frames is generated in accordance with file based directory structures.

6. Apparatus according to claim 5, wherein said file based directory structures are defined with reference to stored metadata.

7. Apparatus according to claim 6, wherein said metadata is stored on a local hard disk drive.

8. Apparatus according to claim 6, wherein said metadata defines clips, reels and desktops.

9. Apparatus according to claim 1, wherein said processing means is configured to translate a selected stored frame into a plurality of alternative formats.

10. Apparatus according to claim 9, wherein said processing means produces a view for each of said plurality of formats.

11. An Image data processing facility, comprising:
    a data conveying network providing data communication between a first programmable processing means and a second programmable processing means in which said second programmable processing means controls an image frame storage means, wherein:
    said image frame storage means has an array of a plurality of storage devices configured to store image frames of a predetermined definition;
    said first programmable processing means reads image data from said image frame storage means in a native format;
    said first programmable processing means simulates a file system structure for said image frames and conveys a representation of said file system structure to said second programmable processing means over said network, in which frame-files of said structure appear as if in an alternative format that is required by said second programmable processing means;
    said second programmable processing means is configured to provide user selection of an image frame based on said file structure representation;
    said second programmable processing means conveys details of said selection to said first processing means over said network; and
    said first processing means identifies said selected frame, reads said selected frame in said native format, translates said read frame into said alternative format and transmits said translated frame to said second processing means over said network, wherein said translation is performed on the fly as said selected frame is required by said second programmable processing means.

12. A data processing facility according to claim 11, wherein said image frames have a definition defined in accordance with NTSC, PAL, high definition or cinematographic standards.

13. A facility according to claim 12, wherein said image frames are stored in uncompressed form.

14. A facility according to claim 11, wherein said native format optimises storage requirements for a particular image definition.

15. A facility according to claim 11, wherein a view of stored frames is generated in accordance with file based directory structures.

16. A facility according to claim 15, wherein said file based directory structures are defined with reference to stored metadata.

17. A facility according to claim 16, wherein said first programmable processing means includes a local hard disk drive and said metadata is stored on said local hard disk drive.

18. A facility according to claim 16, wherein said metadata defines clips, reels and desktops.

19. A facility according to claim 11, wherein said first processing means is configured to translate a selected stored frame into a plurality of alternative formats.

20. A facility according to claim 11, wherein said first processing means produces a view for each of said plurality of formats.

21. A method of processing image data, wherein:
    first selected image frames in a native format are read from a frame storage means and are directly modified in response to a first process;
    output signals are produced to a display device to display a view of stored frames, in which said stored frames are stored in said native format but appear in said view as if stored in an alternative format; and
    upon receiving input signals selecting a displayed frame, translating said selected stored frame on the fly as said displayed frame is required into said alternative format and supplying said translated frame to a second process.

22. A method according to claim 21, wherein said image frames have a definition defined in accordance with NTSC, PAL, high definition or cinematographic standards.

23. A method according to claim 22, wherein said image frames are stored in uncompressed form.

24. A method according to claim 21, wherein said native format optimises storage requirements for a particular image definition.

25. A method according to claim 21, wherein a view of stored frames is generated in accordance with file based directory structures.

26. A method according to claim 25, wherein said file based directory structures are defined with reference to stored metadata.

27. A method according to claim 26, wherein said stored metadata is stored on a local hard disk drive.

28. A method according to claim 26, wherein said metadata defines clips, reels and desktops.

29. A method according to claim 21, wherein selected stored frames are translated into a plurality of alternative formats.

30. A method according to claim 29, wherein a view for each of said plurality of formats is generated.

31. A computer readable medium having computer readable instructions executable by a computer such that, when executing said instructions, a computer will perform the steps of:
   reading first selected image frames in a native format from a frame storage means and modifying said first selected image frames in response to a first process;
   producing output signals to a display device to display a view of stored frames to a second process, in which said stored frames are stored in said native format but appear in said view to said second process as if stored in an alternative format that is required by said second process;
   said first process receiving input signals, from said second process, selecting a displayed frame; and
   said first process translating said selected stored frame into said alternative formats and supplying said translated frame to said second process on the fly as said stored frame is required by said second process.

32. A computer readable medium having computer readable instructions according to claim 31 such that, when executing said instructions, a view of stored frames is generated in accordance with file based directory structures.

33. A computer readable medium having computer readable instructions according to claim 32 such that, when executing said instructions, said file based directory structures are defined with reference to metadata stored on a local hard disk drive.

34. A computer readable medium having computer readable instructions according to claim 31 such that, when executing said instructions, a computer will translate selected stored frames into a plurality of alternative formats.

35. A computer readable medium having computer readable instructions according to claim 34 such that, when executing said instructions, a computer will generate a view for each of said plurality of formats.

36. A method of reading image frames as files wherein said image data is stored as contiguous clips of image frames and a local processing system reads said image frames as a clip and processes said image frames as a clip;
   said local processing system presents said clip to a network in the form of a plurality of frame files in an alternative format;
   a second remote processing system identifies said plurality of image frames over said network and makes request for selected ones of said image frames;
   said local processing system converts said selected frames and supplies said frames in an alternative format to said second remote processing system, wherein said local processing system converts said selected frames on the fly as said selected frames are required by said second remote processing system.

* * * * *